of applica-
United States Patent [19]
Ray-Chaudhuri

[11] 3,891,589

[45] June 24, 1975

[54] PROCESS FOR PREPARING STABLE HIGH SOLIDS AQUEOUS SOLUTION OF CATIONIC THERMOSETTING RESINS

[75] Inventor: Dilip K. Ray-Chaudhuri, Somerville, N.J.

[73] Assignee: National Starch and Chemical Corporation, Bridgewater, N.J.

[22] Filed: Aug. 29, 1974

[21] Appl. No.: 501,483

Related U.S. Application Data

[63] Continuation-in-part of Ser. No. 317,424, Dec. 21, 1972, abandoned.

[52] U.S. Cl. ........ 260/29.2 EP; 162/168; 260/78 L; 260/78 P; 260/78 SC
[51] Int. Cl.² .................. C08L 63/00; C08G 69/48
[58] Field of Search ..... 260/78 SC, 29.2 EP, 29.2 N

[56] References Cited
UNITED STATES PATENTS

| | | | |
|---|---|---|---|
| 2,926,154 | 2/1960 | Keim | 260/78 SC |
| 3,125,552 | 3/1964 | Loshaek et al | 260/78 SC |
| 3,197,427 | 7/1965 | Schmalz | 260/29.2 N |
| 3,224,990 | 12/1965 | Babcock | 260/29.2 N |
| 3,239,491 | 3/1966 | Tsou et al. | 260/78 SC |
| 3,240,761 | 3/1966 | Keim et al | 260/78 SC |
| 3,329,657 | 7/1967 | Strazdins et al | 260/78 SC |
| 3,395,130 | 7/1968 | Barrett et al | 260/78 SC |
| 3,434,984 | 3/1969 | Hyland | 260/18 N |
| 3,584,072 | 6/1971 | Winslow | 260/78 SC |
| 3,694,390 | 9/1972 | Winslow | 260/29.1 R |

*Primary Examiner*—Harold D. Anderson

[57] ABSTRACT

A process for preparing cationic thermosetting resins by reacting a polyalkylene polyamine with a dicarboxylic acid reagent and optionally with a lactone, an alkyl ester of acrylic or methacrylic acid, or a lactam, to prepare a polyamide-polyamine intermediate and thereafter reacting the intermediate with epichlorohydrin; said reactions being conducted under controlled concentration ranges, reaction time and temperatures, and molecular weight values. Aqueous solutions of the resulting resins display excellent stability at high total solids contents and are useful in a number of applications such, for example, as wet strength and pigment retention additives in the paper making process.

7 Claims, No Drawings

PROCESS FOR PREPARING STABLE HIGH SOLIDS AQUEOUS SOLUTION OF CATIONIC THERMOSETTING RESINS

This application is a continuation-in-part of our copending U.S. application, Ser. No. 317,424, filed Dec. 21, 1972, now abandoned.

This invention relates to a method for preparing cationic thermosetting resins having improved stability at high total solids contents.

The synthesis of cationic thermosetting resins has been previously reported in numerous patent disclosures including U.S. Pat. Nos. 2,926,116 2,926,154; 3,058,873; 3,159,612; 3,197,427; 3,227,671; 3,250,664; 3,442,754; and 3,647,763. The basic process in each of these disclosures involves the reaction of a polyalkylene polyamine with a carboxylic acid reagent and the subsequent reaction of the intermediate product with epichlorohydrin. In certain instances, additional reactants are utilized in the preparation of the intermediate product, such, for example, as a lactone or alkyl acrylate or methacrylate ester, as disclosed in U.S. Pat. No. 3,647,763 which is owned by the assignee of the instant application or a lactam is disclosed in U.S. Pat. No. 3,250,664. The resulting resins are particularly useful as wet strength additives in the paper making process.

It has been noted that due to the high reactivity of the resins, the solids contents of the final resin solutions have to be maintained at about 10 to 15% in order to prevent their gelation upon standing at room temperature and their loss of wet strength efficiency. Higher solids contents are preferred for numerous reasons including the reduced volume and cost involved in storing and transporting the resin solutions. Previous attempts at stabilization have generally involved pH adjustment of the solution to the acid side (2.0 – 3.5). Such an approach, however, has been disadvantageous inasmuch as special storage equipment has to be provided for the acidic resin solution and the performance of the highly acidic solution is inferior to the performance of resin solutions maintained at a pH level of 5.0 – 5.5. Furthermore, the acid stabilized resin solutions exhibit unsatisfactory stability at elevated temperatures (50°C), temperatures which are frequently encountered under typical storage and transport conditions.

A prior art stabilization technique based upon the acidification approach is disclosed in U.S. Pat. No. 3,197,427. This technique relies upon the combined use of formic and sulfuric acids to lower the pH level of the resinous solution to 2.0 – 3.0. U.S. Pat. No. 3,277,671 discloses a further stabilization approach which involves the addition of small quantities of formaldehyde to the resin solution and the subsequent pH adjustment to a level of 4.0 or lower. In addition to the difficulties encountered as a result of the acid requirements, it is to be noted that each of these techniques introduces an additional process step into the basic procedure, thereby necessarily increasing the cost, time and equipment variables thereof.

It is the primary object of this invention to provide a process for preparing cationic thermosetting resins which exhibit improved stability at high total solids contents.

It is a further object to achieve the improved stability by careful selection of process variables rather than by adding one or more process steps to prior art procedures.

It is still a further object to provide the improved stability without adversely affecting the wet strength properties of the resulting resins.

It is another object to provide the improved stability without relying upon acidification techniques.

Various other objects and advantages of this invention will be apparent from the discussion that follows herein after.

In accordance with the present invention, cationic thermosetting resins of the polyamide-polyamine-epichlorohydrin type which exhibit excellent stability at high solids contents are prepared on the basis of introducing a combination of carefully selected and controlled process variables into a preparative procedure which comprises the condensation copolymerization reaction of a polyalkylene polyamine with a dicarboxylic acid reagent and, if desired, certain optional reactants, followed by the chain extension of the polyamide-polyamine intermediate resin by reaction with epichlorohydrin. These variables may be enumerated as follows:

1. Using of molar ratios of polyamine to carboxylic acid reagent which range between 0.9 and 1.5. In this manner, the polyamidepolyamine intermediate product will exhibit desired amine and/or ester end groups as opposed to the unworkable carboxyl end groups.

2. Preparing and then chain extending resin intermediates which exhibit a reduced specific viscosity of from about 0.05 to 0.18, as determined in methanol at 25°C. this value being indicative of the molecular weight of the intermediate product.

3. Using concentrations of epichlorohydrin which range from about 1.25 to 4.0, preferably 1.5 to 2.0, moles of epichlorohydrin per equivalent weight of polyamide-polyamine intermediate.

4. Conducting the chain extension reaction such that the substitution reaction predominates initially and thereafter the chain extension reaction. Thus, the epichlorohydrin is rapidly added to the intermediate solution at temperatures below about 40°C and the reaction is allowed to proceed initially at temperatures ranging from about 25° to 40°C for a period of about 1 to 4 hours. This low temperature reaction facilitates the following type of substitution reaction:

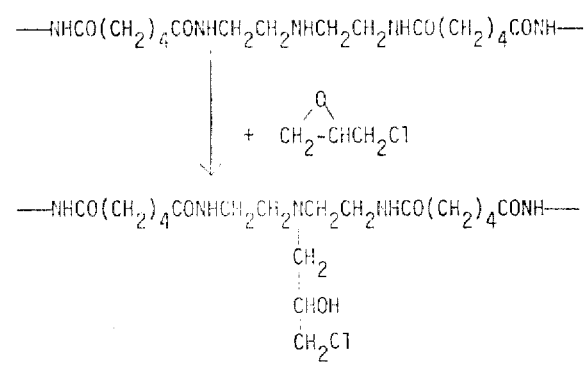

Subsequent reaction temperatures of from about 50° to 90°C over a period of about 2 to 10 hours facilitates the following chain extension reaction:

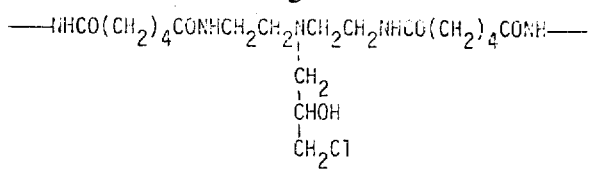

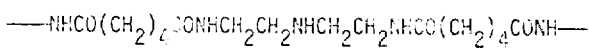

+

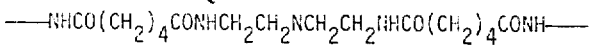

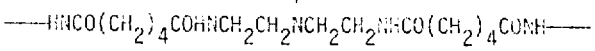

It should be noted that these equations are merely exemplary of the type of reactions encountered, it being extremely difficult to present accurate structural formulas due to the complexity of the polymeric configuration which results from continued substitution and chain extension.

While the prior art disclosures cited hereinabove may overlap in any one of these areas, it must be recognized that it is the combined presence of all of these variables in the novel process of this invention that provides the improved and unexpected results.

As a result of this process, cationic thermosetting resin solutions which are extremely stable at room and elevated temperatures are prepared at total solids contents of from about 15–55%, by weight, preferably from about 20 to 45% by weight. As noted, these results are achieved by careful selection and control of the process variables rather than by adding costly and time consuming process steps. Stabilization also does not depend on severe acidification, the ability to achieve stabilized systems at pH levels of about 4.5 – 6.0 thereby avoiding the difficulties inherent with highly acidic products. Furthermore, the process of this invention provides improved stability at high solids contents without adversely affecting the wet strength properties of the resulting products.

In brief, the novel process of this invention comprises the steps of 1a. reacting specified concentrations of at least one polyalkylene polyamine with at least one dicarboxylic acid reagent; or 1a. reacting specified concentrations of at least one polyalkylene polyamine with at least one lactone, lactam, or alkyl ester of acrylic and methacrylic acid, and thereafter reacting the resulting (co)-polyamine-lactone, or (co)-polyamine-lactam, or (co)-polyamine-ester adduct with at least one carboxylic acid reagent; and 2. chain extending the (co)polyamide-polyamine intermediate resulting from either step (1a) or (1b) by reacting it, at dual temperature conditions, with epichlorohydrin.

The polyalkylene polyamine compounds applicable for use in the process of this invention correspond to the formula $$H_2N — [(CH_2)_n —NR]_mH$$

wherein $n$ is an integer having a value of from 2 to 6 inclusive, $m$ is an integer having a value of from 1 to 6 inclusive, and R is selected from the group consisting of hydrogen atom and alkyl radical. When R is an alkyl radical it is mere appendage on the molecule and has no effect on the reaction.

Thus, among the preferred applicable polyamine compounds are included: ethylenediamine, diethylene-triamine, triethylene-tetramine, tetraethylenepenta-mine, pentaethylenehexamine, hexamethylenediamine, bis-(trimethylene) triamine, bis-hexamethylene-triamine, etc. to repetitive units reading 100, piperazine, and substituted piperazines.

It should be noted that more than one of the polyamines corresponding to the above formula may be simultaneously utilized in the reaction system. Thus, if desired, the practitioner may utilize crude residues containing mixtures of amines, e.g. those residues resulting from the interaction between dichloroethane and ammonia, as the polyamine starting material for the novel process of this invention. It sould be further noted that when the above depicted polyalkylene polyamine compound is one which contains two or more primary amine groups of the value of $m$ exceeds about 8, it is highly likely that it will exhibit a branched configuration; such branched polyamines also are deemed readily applicable for use in the process of this invention.

The lactone compounds which are applicable for use in the process of this invention correspond to the formula

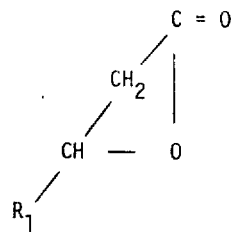

wherein $R_1$ is selected from hydrogen atoms and saturated, aliphatic, straight chain hydrocarbon radicals containing from one to 16 carbon atoms. Among the applicable lactones are included: beta-propiolactone, and beta-butyrolactone.

The lactam compounds which are applicable for use correspond to the formula

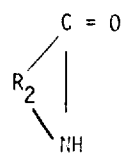

wherein $R_2$ is divalent radical selected from the group consisting of aliphatic hydrocarbons containing from three to 18 carbon atoms. Applicable lactams include pyrrolidone, epsilon-caprolactam, and the like.

The esters applicable for use in the process of this invention correspond to the formula:

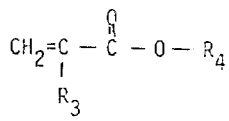

wherein $R_3$ is a hydrogen or methyl and $R_4$ is an alkyl radical having one to four carbon atoms. Thus, the esters are alkyl esters of acrylic or methacrylic acid, e.g. methylacrylate, ethylacrylate, methyl methacrylate, and butyl acrylate.

The dicarboxylic acid component applicable for use in the process of this invention may be selected from the group consisting of saturated dicarboxylic acids containing from about 2 to 20 carbon atoms and the anhydrides and dialkyl esters thereof. Specific acids which are representative of each of these groups include: adipic acid, dimethyl adipate, succinic acid, succinic anhydride, glutaric anhydride, azelaic acid; sebacic acid, suberic acid, isosebacic acid, diglycolic acid, dimethyl succinate, dimethyl glutarate. diethyl succinate, dimethyl azelate, dimethyl sebacate, and the like.

In more detail, the novel procedure of this invention comprises slowly admixing, in a carbon dioxide-free atmosphere, the polyamine reagent, the dicarboxylic acid reagent and water and, thereafter heating the resulting mixture at a temperature of from about 110 to 250°C for a period of about one-half to 4 hours at atmospheric or reduced pressure. The reaction is continued until the (co)polyamide-polyamine intermediate exhibits a reduced specific viscosity (RSV) value of from about 0.05 to 0.18, and preferably from about 0.06 to 0.13; the latter characteristic being determined on a 1%, by weight, resin solution in methanol at 25°C and being indicative of the molecular weight of the cationic intermediate.

Where lactones, lactams or acrylate or methacrylate esters are included in the reaction, the procedure comprises slowly admixing, in a carbon dioxide-free atomsphere, the polyamine reagent, water and either the lactone, lactam or ester and, thereafter heating the reaction mixture at a temperature of from about 30° to 150°C, and preferably from about 50° to 100°C, for a period of about one-half to 3 hours. Needless to say, the duration of the reaction will depend on the reaction temperature which is utilized as well as on the specific nature of the reactants. Completion of the reaction can be determined by following the disappearance of either the lactone carbonyl absorption band, the ester unsaturation absorption band, or the lactam carbonyl absorption band on the infra-red spectra of the respective products.

Upon completion of this initial reaction, the dicarboxylic acid reagent is admixed with the reaction mixture. The temperature is then increased to a level of from about 100° to 200°C and the reaction allowed to proceed for a period of about one-half to 4 hours. As in the initial reaction, variations in temperature and pressure may be used with a corresponding increase or decrease in the duration of the reaction. Once again, the reaction is discontinued when the resulting (co)-polyamidepolyamine intermediate exhibits the specified reduced specific viscosity.

With regard to proportions, the moleratio of polyalkyl polyamine to dicarboxylic acid reagent will range between about 0.9 to 1.5 in order that the end groups of the intermediate product exhibit only amine and/or ester groups. Where other reactants are present the determination of the precise concentration of the ingredients involved in the preparation of the cationic intermediates, as based on the stoichiometric equivalencies of the reactions, is left to the discretion of the practitioner and will depend, of course, on the characteristics which are desired in the copolyamide-polyamine intermediate. In most instances, however, the molar proportions of lactone : dicarboxylic acid reagent : polyamine will range from about 0.01:0.99:1.5 to 1.0:0.01:1.0; acrylate or methacrylate ester : dicarboxylic acid reagent : polyamine will range from about 0.01:1.0:1.5 to 1.0:0.01:1.1; lactam : dicarboxylic acid reagent : polyamine will range from about 0.01:0.7:0.9 to 2.0:1.0:1.3. The use of the required reagents within the latter range of concentrations thereby insures sufficient reaction with the primary amine groups of the polyamine, proper control of the subsequent chain extension reaction and the formation of high molecular weight resins.

Thereafter, the thus prepared intermediate is dissolved in water to make a 50–75%, by weight, aqueous solution and is then further diluted to about 15–50%, by weight, Epichlorohydrin is admixed with the solution at room temperature, the epichlorohydrin being added in a concentration ranging from 1.25 to 4.0 moles of epichlorohydrin per equivalent weight of polyamide intermediate, and preferably 1.50 – 2.00.

The reaction mixture is then heated to 25° – 40°C over a period of one-half to 2 hours and the reaction allowed to proceed at this temperature for an additional period of about 1 to 4 hours. This low temperature heating induces the substitution reaction previously described. The temperature is then increased to about 50° to 90°C over a period of about 2 to 10 hours in order to induce the previously described chain extension reaction. The chain extension reaction is deemed completed when the desired viscosity of the reactoin mix is attained; the latter viscosities varying from A to Z on the Gardner-Holdt scale. When this desired viscosity is reached, the resin solution is cooled, diluted with water and then pH adjusted by adding sufficient acid to reduce its pH to a level of about 4.5 to 6.0. Any suitable organic or inorganic acid such as hydrochloric, sulfuric, nitric, oxalic and acetic acids may be utilized to reduce the pH level.

The resulting chain extended, cationic thermosetting resin solutions may now exhibit total solids contents ranging up to about 55%, by weight, while still exhibiting excellent storage stability and wet strength efficiency.

As previously indicated, the resins prepared by the novel process of this invention function as excellent wet strength additives, pigment retention and drainage aids in the paper making process, and as flocculating agents for both organic and inorganic solids. Of great importance, they provide these characteristics over a wide range of operating conditions.

Furthermore, it should be noted that these chain extended resins may be effectively utilized, in the paper-making or external paper-treating process, in conjunction with conventional paper additives such, for example, as starches, starch derivatives, cellulosic derivatives, polyvinyl alcohol and gums, thereby resulting in the preparation of total paper products.

The resins may be employed in any of the conventional methods of preparing paper sheets and other paper products. The preferred method for incorporating these resins, whether they be in solution, emulsion or other dispersed form, is by internal addition to the cellulosic pulp material prior to the formation of the solid paper sheet. Thus, an aqueous solution of the resin may be added to an aqueous suspension of the paper stock while the latter is in the head box, beater, hydropulper, stock chest or at any other point in the paper making process prior to the point of sheet formation. Among the variety of pulps which may be effectively treated are included: Bleached and unbleached sulfate (kraft), bleached and unbleached sulfite, bleached and unbleached soda, neutral sulfite, semichemical, chemi-groundwood, hardwood or any combination of these fibers. These designations refer to wood pulp fibers which have been prepared by means of a variety of processes which are known in the pulp and paper industry. In addition, synthetic fibers of the viscose rayon, regenerated cellulose, polyamide or polyester type can also be used. It is essential to note that the latter pulp slurries may be maintained over a wide range of pH levels, i.e., from about 4 to 11, and still be effectively treated by the resins.

Thereafter, the sheet is formed, pressed in order to reduce its moisture content and dried by conventional means, the latter drying operation serving to cure the resin to its polymerized and water-insoluble state. The curing procedure may be conducted under acid, neutral or alkaline conditions, although such factors as optimum performance and minimum corrosion suggest that the curing step be conducted at pH levels ranging from about 6 to 9.

In practice, the resins are generally added to the pulp slurry in amounts ranging from about 0.01 to 5.0%, based on the dry weight of the pulp. Within this preferred range, the precise amount will depend upon the type of pulp being used, the specific operating conditions and on the characteristics desired in the finished paper product.

The resins may also be applied to the finished paper stock by a variety of immersion and spraying techniques. Thus, for example, a paper sheet may be immersed in an aqueous solution of the resin, whereupon the treated sheet is cured by being heated at a temperature of about 40° to 150°C for a period of about one-half to 180 minutes. The resulting paper sheets exhibit greatly increased wet strength properties and, thus, this procedure is especially well suited for the impregnation of aper towels, absorbant tissue, wrapping paper, bag paper and the like.

The following examples will further illustrate the embodiment of this invention. In these examples, all parts given are by weight unless otherwise noted.

EXAMPLE I

This example illustrates the preparation of a stable, high solids polyamide-polyamine-epichlorohydrin resin typical of the products of this invention.

A reaction vessel fitted wtih a sealed mechanical stirrer, a thermometer and a condenser attached to a carbon dioxide absorbing tube, was charged with 103.8 parts diethylenetriamine and 174 parts dimethyl adipate (acid No. 3.54) was added thereto and the temperature of the reaction mixture was slowly raised to 130°–135°C over a period of an hour. The reaction was allowed to continue at this temperature for an hour, the methanol formed by the ester-amide interchange reaction being distilled from the system 72.2 therewith. The temperature of the reaction mixture was raised to 145°C. over a period of one-half hour and the reaction allowed to continue at this temperature for one-half hour. A small sample was taken out for the determination of reduced specific viscosity (RSV) in methanol whereupon 174 parts of distilled8c water was added slowly to the mixture over a period of 15 minutes. The resulting polyamide-polyamine solution contained 55.1% solids. The RSV in methanol at 25°C. and the equivalent weight of the polyamide-polyamine were 0.102 and 202.5, respectively. and the The chain extension reaction proceeded by charging 183.5 parts of the above prepared intermediate, 70.5 parts of water and 72.5 parts of epichlorohydrin (1.56 moles of epichlorohydrin per equivalent weight of the intermediate) into a flask fitted with a condenser and a $CO_2$ absorbing tube, a thermometer and means for mechanical agitation. The exothermic reaction of epichlorohydrin and amine raised the temperture of the mixture to about 40° over a period of 25 minutes. The reaction was allowed to continue at this temperature for 2 hours. Thereafter, the temperature was raised to 60°–65°C. over a period of 1¼ hours and the reaction continued. The Gardner viscosity of the reaction mixture was measured during the course of reaction. The reaction was complete after a period of 3¼ hours at which point the Gardner viscosity reached a value of T-U and pH had dropped from 9.5 to 7.3. The reaction mix was then diluted with 100 parts of water, cooled to 25°C. and brought to a pH of 5.0 with 8.7 parts of 31% by weight, aqueous nitric acid. The final product contained a solids content of 37% and had a Gardner viscosity of D-E.

The stability of the resulting high solids, resin solution was determined by storing a sample of the solution at 25°–30°C and 50°C, respectively, and noting the elapsed time till first signs of gelation. The product of this examples showed a stability in excess of 6 months at 25°–30°C and a stability in excess of 2 weeks at 50°C.

EXAMPLE II

This example illustrates the preparation of a stable, high solids copolyamide-polyamine-epichlorohydrin resin using the optional embodiment of the invention which comprises reacting the (co)-polyamine with a lactone, lactam or (meth)acrylate ester prior to reaction with the dicarboxylic acid reagent.

A reaction vessel fitted with a sealed mechanical stirrer, a thermometer and a condenser attached to a carbon dioxide absorbing tube, was charged with 207.55 parts of diethylenetriamine and 43 parts of methyl acrylate, which was added slowly to the amine over a period of half an hour at 25°C. As the addition of acrylate proceeded, the temperature of the mixture started to rise due to the exothermic addition reaction of amine to acrylate double bond. At the end of the acrylate addition, the reaction was allowed to continue for half an hour at 65°–70°C. Completion of the reaction was determined by monitoring the disappearance of the unsaturation absorbtion band for acrylate on an infra-red spectrum of the product.

Thereafter, 306 parts of dimethyl adipate (acid No. 3.54) was added to the ester-amine adduct and the temperature of the reaction mixture was slowly raised to 130°–135°C over a period of an hour. The reaction was allowed to continue at this temperature for an hour, the methanol formed by the ester-amide interchange reaction being distilled from the system simultaneously therewith. The temperature of the mixture was raised to 145°C over a period of 20 minutes and the reaction was allowed to continue at this temperature for 45 minutes. A small sample was taken out for the determination of reduced specific viscosity (RSV) in methanol whereupon 350.7 parts of distilled water was added slowly to the mixture over a period of 15 minutes. The resulting copolyamide-polyamine solution contained 54.7% solids. The RSV in methanol at 25°C and the equivalent weight of the copolyamide-polyamine were 0.102 and 209.5, respectively.

The chain extention reaction proceeded by charging 191.5 parts of the above prepared intermediate, 70.5 parts of water and 72.1 parts of epichlorohydrin (1.56 equivalents of epichlorohydrin per equivalent of intermediate) into a flask fitted with a condenser and a $CO_2$ absorbing tube, a thermometer and means for mechanical agitation. The exothermic reaction of epichlorohydrin and amine raised the temperature of the mixture to about 40°C over a period of 35 minutes. The reaction was allowed to continue at this temperature for 2 hours. Thereafter, the temperature was raised to 60°–65°C over a period of 1¼ hours and the reaction continued. The Gardner viscosity of the reaction mixture was measured during the course of reaction. The reaction was complete after a period of 4¼ hours at which point the Gardner viscosity reached a value of R-S and the pH had dropped from 9.5 to 6.95. The reaction mix was then diluted with 105 parts of water cooled to 25°C and brought to a pH of 5 to 8.7 parts of 31%, by weight, aqueous nitric acid. The final product contained 37.3% solids and had a Gardner viscosity of D-E and exhibited superior storage stability properties.

Resins of comparable stability may be prepared by repeating the above procedure under similar conditions with the exception that:

1. Ethyl acrylate, butyl acrylate and methyl methacrylate are each, respectively utilized as alkyl ester of (meth)acrylic acid in the preparation of the copolyamide-polyamine intermediate;
2. Diethyl adipate and dimethyl azelate are each, respectively, utilized as the carboxylic acid reagent; and
3. A mixture of amines comprising hexamethylene diamine, bis-hexamethylene triamine and higher homologues of each of latter amines; and a polyethylene amine residue comprising a mixture of pentaethylene hexamine, diaminoethyl triaminoethyl amine, diaminoethyl triethylene tetramine, aminoethyl piperizine and higher homologues of each of the latter polyethylene amines, are each respectively utilized as the (co)-polyamine reagent.

EXAMPLE III

This example illustrates the preparation of a further co-polyamide-polyamine-epichlorohydrin resin by means of the process of this invention.

The copolyamide-polyamine intermediate was prepared from the following ingredients:

| | |
|---|---|
| Diethylenetriamine | 103.8 parts |
| Epsilon-Caprolactam | 28.3 parts |
| Dimethyl Adipate | 174 parts |
| Water | 196.8 parts |

The identical procedure as described in Example II was followed in preparing the intermediate with the following exceptions: (1) the reaction of diethylenetriamine and caprolactam was carried out at 100°C for an hour and the completion of reaction was followed by the disappearance of lactam-carbonyl absorption band on the infrared spectrum; and (2) the time of reaction at 145°C was 30 minutes. The resulting copolyamide-polyamine solution contained 54.0% solids while its equivalent weight and RSV, in methanol at 25°C, were 223.0 and 0.095, respectively.

The above prepared intermediate was then chain extended with epichlorohydrin utilizing the reaction conditions specified in Examples I and II, except that the time of reaction at 65°C was 3 hours and the product was finished at 30.0% solids, by weight, and with a Gardner viscosity of B. The stability of the product, as determined by the procedure of Example I, was slightly improved over that shown by the product prepared in Example II.

The above-described procedure may be identically repeated with the exception that beta-propiolactone or beta-butryolactone may be substituted for the lactam reactant. Comparable stability characteristics are anticipated in the resulting products.

EXAMPLES IV – XII

These examples illustrate the wide variety of reagents and reaction conditions which can be efficiently utilized in the novel process of this invention.

A number of cationic polymers were prepared according to the general procedure set forth in Examples I and II, utilizing a variety of reagents at different concentration levels and under varying reaction conditions. These variables are presented in the following table wherein "Step 1" refers to the preparation of copolyamide-polyamine and "Step 2" refers to the chain extension of the latter intermediates in order to prepare the desired high molecular weight cationic polymers.

STEP 1

| Intermediate Number | IV | V | VI | VII | VIII | IX | X | XI | XII |
|---|---|---|---|---|---|---|---|---|---|
| | | | Parts | | | | | | |
| 1. Dimethyl adipate | — | 306.0 | 52.2 | 130.5 | — | 130.5 | 114.2 | 174 | 153 |
| 2. Dimethyl succinate | — | — | — | 36.5 | 73 | — | — | — | — |
| 3. Methyl acrylate | — | 43.0 | 10.8 | — | — | — | — | — | 21.5 |
| 4. Dimethyl sebacate | — | — | — | — | — | — | 21.6 | — | — |
| 5. Diethylenetriamine | 128.8 | 207.6 | 76.5 | 108.2 | 104.0 | — | — | 90.6 | 103.8 |

STEP 1 -Continued

| Intermediate Number | IV | V | Parts VI | VII | VIII | IX | X | XI | XII |
|---|---|---|---|---|---|---|---|---|---|
| 6. Ethylene diamine | — | — | — | — | — | 5.6 | — | — | — |
| 7. Hexamethylene diamine | — | — | — | — | — | 10.9 | — | — | — |
| 8. Tetraethylene pentamine | — | — | — | — | — | 113.5 | 143.0 | — | — |
| 9. Bis-Hexamethylene triamine | — | — | — | — | — | — | — | 26.9 | — |
| 10. Dimethyl glutarate | — | — | — | — | 80.0 | — | — | — | — |
| 11. Adipic acid | 146.0 | — | — | — | — | — | — | — | — |
| 12. Dilution water | 294.3 | 350.7 | 87.9 | 172.9 | 158.0 | 126.5 | 188.3 | 121.5 | 175.4 |
| a. Time of reaction of amine and alkyl acrylate (Hr.) | — | 1 | 1 | — | — | — | — | — | 1 |
| b. Temperature of reaction of amine and alkyl acrylate (°C) | — | 60–68 | 60–70 | — | — | — | — | — | 60–70 |
| c. Time of reaction of ester-amine adduct or amine with carboxylic acid reagent at the highest temperature (Hr.) | 2* | 1 | ½ | ¼ | ¼ | ½ | ¼ | 1⅓ | 1¾ |
| d. Highest temperature of reaction of ester-amine adduct (°C) | 145 | 145 | 150–155 | 145 | 145 | 145 | 145 | 130–132 | 130–132 |
| e. Total time of reaction (Hrs) | 4½ | 1 | ½ | 2½ | 2½ | 3 | 2¾ | 2⅓ | 3½ |
| f. RSV in methanol at 25°C | 0.07 | 0.11 | 0.12 | 0.095 | 0.113 | — | 0.109 | 0.069 | 0.078 |
| g. Equivalent weight | 176.5 | 208.5 | 227 | 182.5 | 192.2 | 208 | 172.5 | 201.0 | 203 |
| h. Solids content of Intermediate (%, by weight) | 55.8 | 54.7 | 55.0 | 54.7 | 55.2 | 63.8 | 55.6 | 64.9 | 53.9 |

*Conducted under reduced pressure of 200 mm. Hg.

Step 2

| Example Number | IV | V | VI | VII | VIII | IX | X | XI | XII |
|---|---|---|---|---|---|---|---|---|---|
| 1. Intermediate IV | 158.2 | — | — | — | — | — | — | — | — |
| 2. Intermediate V | — | 95.4 | — | — | — | — | — | — | — |
| 3. Intermediate VI | — | — | 45.5 | — | — | — | — | — | — |
| 4. Intermediate VII | — | — | — | 167.0 | — | — | — | — | — |
| 5. Intermediate VIII | — | — | — | — | 104.5 | — | — | — | — |
| 6. Intermediate IX | — | — | — | — | — | 97.7 | — | — | — |
| 7. Intermediate X | — | — | — | — | — | — | 93.2 | — | — |
| 8. Intermediate XI | — | — | — | — | — | — | — | 155 | — |
| 9. Intermediate XII | — | — | — | — | — | — | — | — | 188.3 |
| 10. Epichlorohydrin | 72.2 | 36.1 | 15.9 | 72.1 | 43.3 | 43.2 | 43.2 | 72.1 | 72.1 |
| 11. Initial dilution water | 62.3 | 78.6 | 79.5 | 61.0 | 88.0 | 110.3 | 79.3 | 68.0 | 40.7 |
| 12. Final dilution water | 231.0 | 84.0 | 67.2 | 100.0 | 250.0 | 252.8 | 260.2 | 88.4 | 58 |
| a. Initial pH of reaction mixture | 9.5 | 9.4 | 9.7 | 9.5 | 9.3 | 9.3 | 9.2 | 9.4 | 9.5 |
| b. Reaction time at 25–40°C (Hrs.) | 2 | 2¼ | 2½ | 2¼ | 2½ | 2½ | 3 | 3⅓ | 3⅓ |
| c. Final reaction temp (°C) | 65–72 | 60–75 | 55–60 | 55–70 | 55–56 | 53–55 | 54–56 | 60–75 | 50–58 |
| d. Reaction time at the final temp. (Hrs.) | 3 | 6½ | 4¼ | 4½ | 2½ | 2¼ | 2¾ | 7 | 5¼ |
| e. Gardner viscosity | S–T | N–O | I–J | R–S | I | M–N | O | T | S–T |
| f. Final pH of reaction | 5.85 | 6.25 | 6.9 | 7.5 | 7.9 | 7.8 | 7.9 | 6.6 | 7.5 |
| g. pH of stabilized resin | 5.0 | 5.0 | 5.0 | 5.0 | 5.0 | 4.5 | 5.0 | 5.0 | 5.0 |
| h. Gardner viscosity of stabilized resin | D | B–C | E–F | D | A–B | A–B | A | C | D |
| i. Solid content of stabilized resin (%, by weight) | 30.0 | 27.8 | 18.5 | 37.3 | 20.0 | 20.0 | 18.2 | 43.2 | 49.3 |
| j. Stability at 52°C | >2 | >3 | >3 | >3 | >3 | >3 | >3 | >3 | >3 |

The data presented hereinabove clearly indicate the effectiveness of the novel process of this invention in the utilization of a wide range of reagents and reaction conditions.

EXAMPLE XIII

This example illustrates the effect of different proportions of epichlorohydrin and copolyamide-polyamine on the stability of chain extended product.

A copolyamide-polyamine intermediate was prepared according to the procedure of Example II using 207.6 parts of diethylenetriamine, 43.0 parts of methyl acrylate and 306.0 parts dimethyl adipate. The intermediate solution contained 54.7% solids while its equivalent weight and RSV were 214.0 and 0.10, respectively.

Several chain extension reactions of the above copolyamidepolyamine intermediate solution using different molar amounts of epichlorohydrin per equivalent of polymer were run following the reaction conditions of Example II.

The 50°C stabilities of the chain extended samples were determined with the following results:

| Moles of Epichlorohydrin Equivalent of Prepolymer | Finished Solids % | Stability at 50°C (days) |
|---|---|---|
| 1.00 | 20.7 | 1 |
| 1.00 | 29.0 | 1 |
| 1.25 | 31.4 | 3 |
| 1.40 | 29.1 | 5 |
| 1.56 | 39.0 | 14 |
| 2.00 | 37.4 | >21 |
| 3.00 | 34.3 | >21 |
| 4.00 | 34.1 | >21 |

With use of 3 and 4 moles of epichlorohydrin, the yields of the chain extended materials were 83.2% and 67%, respectively. In other cases the yields were above 95%. In addition, with 4 moles of epichlorohydrin, it was necessary to add about 2% methanol based on the copolyamide-polyamine to the reaction mix in order to make it homogeneous The above data indicates that the stability of high solids resin solution is highly dependent on the proportion of epichlorohydrin to (co)-polyamide intermediate and, further, illustrates the advisability of utilizing the range specified herein, particularly the preferred 1.5–2.0 range.

EXAMPLE XIV

This example illustrates the excellent wet strength exhibited by paper which has been modified by the addition thereto of the high solids cationic thermosetting resins of this invention.

The following procedure was employed in order to demonstrate the excellent wet strength characteristics imparted to paper by the novel resins of this invention. Thus, the specified concentration of resin solution was admixed with 3,000 milliliters of an aqueous slurry of a beaten unbleached sulfate pulp which had been adjusted to a consistency of 0.5%, by weight, and which was at a pH level of 7.5. Paper sheets whose dimensions were 12 inches × 12 inches were then prepared from each of the slurries utilizing the William's Standard Sheet Mold. The resulting sheets were squeezed in a press which applied a pressure of 2,000 pounds per square inch for a period of 8 to 10 minutes. A portion of each sheet was then cured at a temperature of 100°C for one hour.

Sections of both the cured and uncured paper sheets, which were one-half inches wide and 6 inches long, were immersed in water for a period of 30 minutes, these sections serving as the wet strength test specimens. Strips one-half inch in width were then cut from the various specimens and were subjected to a pulling force of 2 inches per minute on an Instron Tensile Tester in order to measure the force necessary to tear the paper specimens.

In order to check the wet strength properties of the products of this invention at pH 6 and 8.5, the stock pH was adjusted with 10% alum and 10% sodium hydroxide, respectively, before the addition of resin solution.

The results of these determinations are presented in the following table:

| Resin Sample Number | Stock pH | % of resin based on dry wt. of pulp | Dry Strength lb./inch | | Wet Strength lb./inch | |
|---|---|---|---|---|---|---|
| | | | Uncured | Cured | Uncured | Cured |
| Control* (no resin added) | 7.6 | — | 35.6 | 35.6 | 0.7 | 0.9 |
| Example II | 7.6 | 0.2 | 40.8 | 44.4 | 6.0 | 8.6 |
| | 7.6 | 0.4 | 40.2 | 45.0 | 8.4 | 12.6 |
| | 7.6 | 0.6 | 41.0 | 42.0 | 9.4 | 13.4 |
| | 7.6 | 0.8 | 43.4 | 45.0 | 11.8 | 15.0 |
| | 7.6 | 1.0 | 45.6 | 49.4 | 12.8 | 15.8 |
| Control* (no resin added) | 8.5 | — | 29.0 | 29.6 | 0.5 | 0.6 |
| | 7.5 | — | 35.0 | 35.0 | 0.8 | 0.8 |
| | 6.0 | — | 34.2 | 34.8 | 1.5 | 2.0 |
| Example II | 7.6 | 0.2 | 44.5 | 48.8 | 7.2 | 9.6 |
| | 7.6 | 0.4 | 45.0 | 49.4 | 8.3 | 11.7 |
| | 7.6 | 0.6 | 49.3 | 51.2 | 9.5 | 13.9 |
| | 7.6 | 0.8 | 51.6 | 55.2 | 11.9 | 16.0 |
| | 7.6 | 1.0 | 51.8 | 55.8 | 12.7 | 18.2 |
| | 8.5 | 0.4 | 46.0 | 48.4 | 8.5 | 11.6 |
| | 6.0 | 0.4 | 47.4 | 52.4 | 9.2 | 13.9 |
| Control* (no resin added) | 8.5 | — | 34.8 | 35.0 | 0.8 | 1.0 |
| | 7.6 | — | 36.1 | 36.6 | 1.0 | 1.0 |
| | 6.0 | — | 37.2 | 38.0 | 1.8 | 2.2 |
| Example VI | 8.5 | 0.2 | 38.1 | 40.8 | 6.9 | 8.7 |
| | 8.5 | 0.6 | 39.6 | 43.2 | 9.4 | 13.8 |
| | 8.5 | 1.0 | 42.5 | 45.8 | 13.6 | 18.7 |
| | 7.6 | 0.2 | 34.7 | 36.8 | 7.8 | 10.2 |
| | 7.6 | 0.6 | 41.5 | 43.4 | 9.5 | 13.6 |
| | 7.6 | 1.0 | 42.3 | 43.5 | 11.2 | 16.1 |
| | 6.0 | 0.2 | 36.5 | 38.0 | 8.1 | 10.7 |
| | 6.0 | 0.6 | 37.1 | 39.0 | 9.2 | 13.0 |
| | 6.0 | 1.0 | 39.5 | 42.8 | 10.9 | 15.3 |
| Control* | 7.6 | — | 34.8 | 35.0 | 0.6 | 0.8 |
| Example III | 7.6 | 0.2 | 41.4 | 44.5 | 6.1 | 10.2 |
| | 7.6 | 0.6 | 45.6 | 47.8 | 9.1 | 14.7 |
| | 7.6 | 0.8 | 46.2 | 50.2 | 11.2 | 16.8 |
| Example I | 7.6 | 0.2 | 42.4 | 45.6 | 6.2 | 10.0 |
| | 7.6 | 0.6 | 45.0 | 47.2 | 9.6 | 14.2 |
| | 7.6 | 0.8 | 45.4 | 49.8 | 11.4 | 17.0 |
| Control* (no resin added) | 7.6 | — | 35.0 | 36.0 | 0.9 | 1.0 |
| Example IV | 7.6 | 0.2 | 39.6 | 42.5 | 7.1 | 9.2 |
| | 7.6 | 0.6 | 40.7 | 43.8 | 8.4 | 11.8 |
| | 7.6 | 0.8 | 42.1 | 45.7 | 10.8 | 16.1 |

*In order to present valid comparative results, a control was included with each test series.

The results summarized above clearly indicate that the high solids (co)-polyamide-polyamine-epichlorohydrin resin solutions offer excellent dry strength and wet strength to paper.

Summarizing, it is seen that this invention provides a novel process for the preparation of cationic thermosetting resins which exhibit excellent stability at high total solids contents.

Variations may be made in proportions, procedures and materials without departing from the scope of this invention as defined in the following claims.

I claim:

1. A process for preparing an aqueous solution of a cationic thermosetting resin having a total solids content of 15–55% by weight of the solution, said solution having improved storage stability, said process comprising the steps of:

A. reacting at 110°–250°C.
      i. at least one polyalkylene polyamine corresponding to the formula:

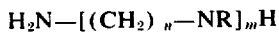
      $$H_2N-[(CH_2)_n-NR]_mH$$

wherein $n$ is an integer having a value of from 2 to 6 inclusive, $m$ is an integer having a value of from 1 to 6 inclusive, and R is selected from the group consisting of hydrogen atoms and alkyl radicals, or ii. the reaction product of at least one polyalkylene polyamine corresponding to the formula:

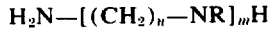
      $$H_2N-[(CH_2)_n-NR]_mH$$

wherein $n$ is an integer having a value of from 2 to 6 inclusive, $m$ is an integer having a value of from 1 to 6 inclusive, and R is selected from the group consisting of hydrogen atoms and alkyl radicals with at least one compound selected from the group consisting of:

a. a beta-lactone corresponding to the formula:

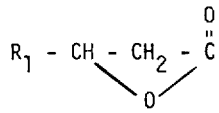

wherein $R_1$ is selected from hydrogen atoms and saturated, aliphatic straight chain hydrocarbon radicals containing from one to 16 carbon atoms;

b. a lactam corresponding to the formula:

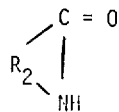

wherein $R_2$ is a divalent radical selected from the group consisting of aliphatic hydrocarbons containing from three to 18 carbon atoms; and c. an ester corresponding to the formula

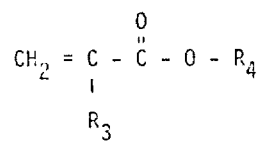

wherein $R_3$ is a hydrogen or methyl, and $R_4$ is an alkyl radical having from one to four carbon atoms;

with at least one saturated dicarboxylic acid, dialkyl ester or anhydride thereof containing from two to 20 carbon atoms, in a molar ratio of polyamine to acid reagent ranging from 0.9 to 1.5, to produce a copolyamide-polyamine intermediate having a reduced specific viscosity at 1% by weight resin solution in methanol at 25°C. of 0.05 to 0.18; and B. reacting, in aqueous medium, resultant (co)-polyamidepolyamine intermediate from step A with epichlorohydrin in a concentration ranging from 1.25 to 4.0 moles of epichlorohydrin per equivalent weight of copolyamide-polyamine intermediate to form the aqueous cationic thermosetting resin solution, said reaction of the intermediate with the epichlorohydrin being conducted initially at temperatures from 25° to 40°C. for a period of 1 to 4 hours and thereafter at 50° to 90°C. for a period of 2 to 10 hours.

2. The process of claim 1, wherein said aqueous resin solution has a total solids content of from about 20 to 45%, by weight.

3. The process of claim 1, wherein said polyalkylene amine is reacted with a beta-lactone in a molar ratio of lactone: carboxylic acid reagent : polyalkylene polyamine ranging from about 0.01:0.99:1.5 to 1.0:0.01:1.0.

4. The process of claim 1, wherein said polyalkylene amine is reacted with a lactam in a molar ratio of lactam : carboxylic acid reagent : polyalkylene polyamine ranging from about 0.01:0.7:0.9 to 2.0:1.0:1.3.

5. The process of claim 1, wherein said polyalkylene amine is reacted with an ester of the formula

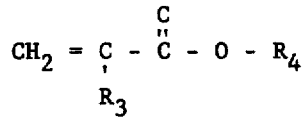

wherein $R_3$ is hydrogen or methyl, and $R_4$ is an alkyl radical having from one to four carbon atoms in a molar ratio of ester: carboxylic acid reagent: polyalkylene polyamine ranging from about 0.01:1.0:1.5 to 1.0:0.01:1.1.

6. The process of claim 1, wherein the reduced specific viscosity of said intermediate is from about 0.06 to 0.13.

7. The process of claim 1, wherein said epichlorohydrin is present in a concentration ranging from about 1.50 to 2.0 moles per equivalent weight of intermediate.

* * * * *

UNITED STATES PATENT OFFICE
CERTIFICATE OF CORRECTION

PATENT NO. : 3,891,589
DATED : June 24, 1975
INVENTOR(S) : Dr. Ray-Chaudhuri

It is certified that error appears in the above–identified patent and that said Letters Patent are hereby corrected as shown below:

Table entitled "Step 2" (Columns 11 and 12), line 12.j., after "j. stability at 52°C" insert -- (weeks) --.

Signed and Sealed this seventh Day of October 1975

[SEAL]

Attest:

RUTH C. MASON
*Attesting Officer*

C. MARSHALL DANN
*Commissioner of Patents and Trademarks*